United States Patent

Parsi

[11] 4,115,225
[45] Sep. 19, 1978

[54] ELECTRODIALYSIS CELL ELECTRODE REVERSAL AND ANOLYTE RECIRCULATION SYSTEM

[75] Inventor: Edgardo J. Parsi, Lexington, Mass.
[73] Assignee: Ionics, Inc., Watertown, Mass.
[21] Appl. No.: 818,041
[22] Filed: Jul. 22, 1977
[51] Int. Cl.² .............................................. B01D 13/02
[52] U.S. Cl. .............................. 204/180 P; 204/301
[58] Field of Search ........................... 204/180 P, 301

[56] References Cited
U.S. PATENT DOCUMENTS

| | | | |
|---|---|---|---|
| 3,192,143 | 6/1965 | Roe et al. .................. | 204/301 X |
| 3,673,068 | 6/1972 | Seko et al. ................. | 204/180 P |
| 3,829,370 | 8/1974 | Bourat ....................... | 204/301 X |
| 3,869,364 | 3/1975 | Tejeda ....................... | 204/301 |
| 3,905,886 | 9/1975 | Wang .......................... | 204/301 X |
| 3,964,985 | 6/1976 | Giuffrida ..................... | 204/301 X |

*Primary Examiner*—Arthur C. Prescott
*Attorney, Agent, or Firm*—Norman E. Saliba

[57] ABSTRACT

An electrode reversal system for an electrodialysis cell is disclosed in which acidic anolyte produced in the anode chamber is collected and simultaneously recirculated through both the anode and cathode chambers. The cathode effluent is removed from the cell and on reversal of electrical polarity, the hydraulic flow paths to and from the chambers are reversed.

7 Claims, 1 Drawing Figure

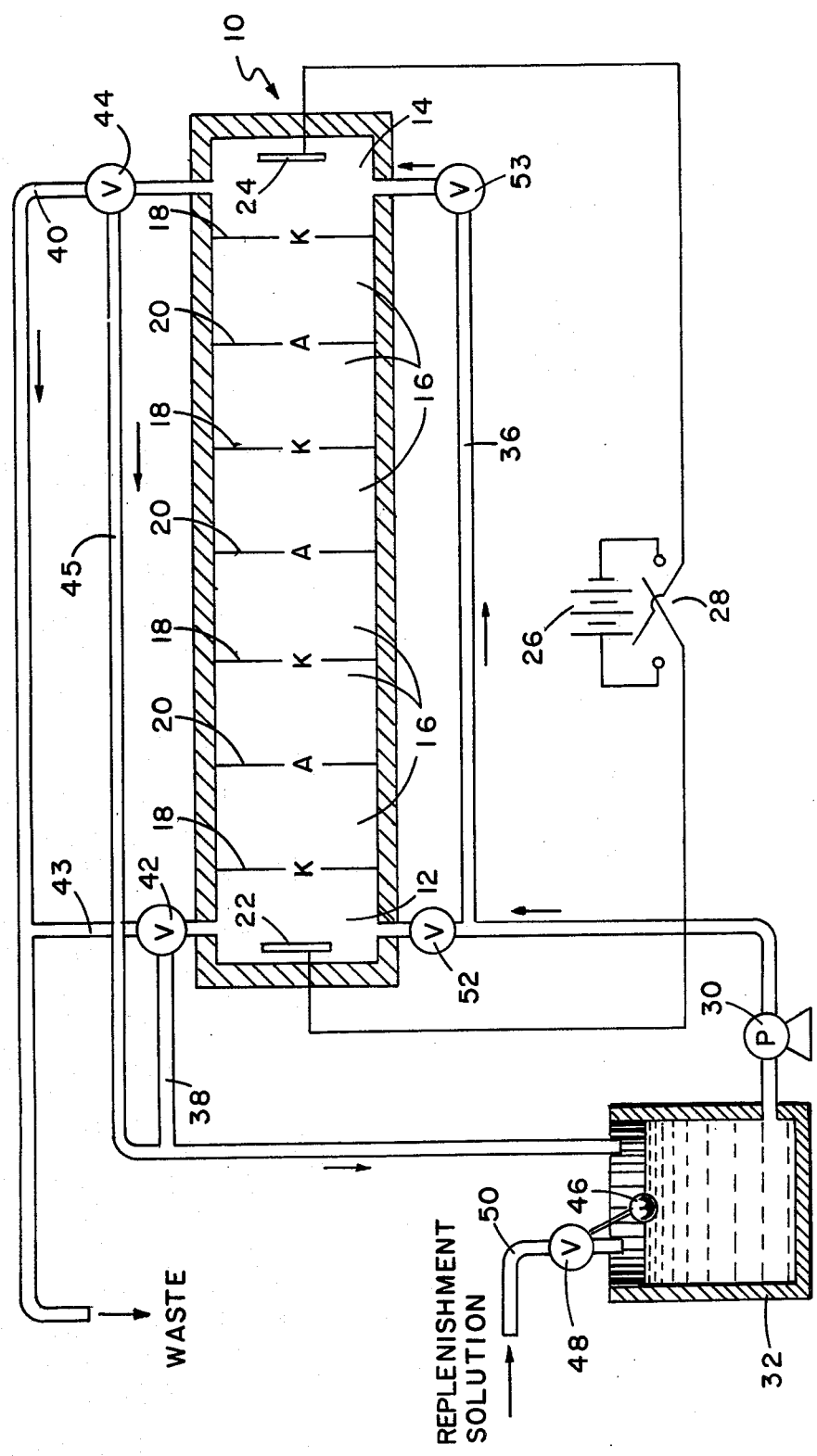

ELECTRODIALYSIS CELL ELECTRODE REVERSAL AND ANOLYTE RECIRCULATION SYSTEM

BACKGROUND OF THE INVENTION

1. Field of the Invention

The invention resides in the field of electrodialysis cells and more particularly relates to electrode reversal systems for preventing the accumulation of scale within the cathode chamber.

2. Description of the Prior Art

In electrodialysis cells the problem of scale buildup due to the formation of insoluble salts within the cathode chamber is well known. An accumulation of such scale results in electric and hydraulic resistance which reduces the efficiency of the cell and may result in total shutdown if not alleviated. Various techniques have been adopted to prevent, reduce, and/or remove the scale including softening the cathode chamber feed solution or catholyte, adding acid to the catholyte and at periodic time intervals reversing the polarity of the cell to generate acid within the cathode chamber which cathode chamber, upon reversal, functions as an acid generating anode chamber.

The concept of reversal has been refined by such techniques as reducing the flow of anolyte through the anode chamber to produce a high concentration of acid within the chamber to dissolve scale more effectively upon reversal. Such a procedure is disclosed in U.S. Pat. No. 3,341,441, Giuffrida et al., which patent is incoporated herein by reference.

An additional reversal approach constitutes collecting the anolyte in a holding tank and passing the accumulated acid solution through the cathode chamber upon reversal as revealed in U.S. Pat. No. 3,165,460, Zang et al.

The method and apparatus described in detail below presents an improvement in the concept of polarity reversal for the prevention of scale buildup over the techniques of the prior art.

SUMMARY OF THE INVENTION

The invention may be summarized as an electrode polarity reversal method and apparatus for electrodialysis cells in which anolyte is collected from the anode chamber and simultaneously passed in parallel flow through both the anode and cathode chambers. The addition of the acidic anolyte to the cathode chamber as it is produced and prior to reversal inhibits certain scale formation from the outset. The cathode chamber effluent or catholyte is then removed from the cell and dumped as waste. Hydraulic reversal occurs simultaneously with the electrical reversal, that is the acidic anolyte which is now produced in the former cathode chamber is collected for recirculation and the basic catholyte now produced in the former anode chamber is withdrawn from the cell and the electrode system.

A number of advantages accrue from this method. A continual flow of electrode solution acts to cool the electrodes and avoid pressure differences across membranes which result when the anolyte flow remains static or small. Gas buildup within the electrode chamber is also prevented by continuous liquid flow therethrough. Most important, the creation of scale in the cathode chamber is held to a minimum from the beginning of the operation of the cell. As discussed above, previous techniques were primarily designed to remove scale after formation by generating and/or circulating acid through the cathode chamber upon polarity reversal. During the period of cathodic scale formation prior to reversal, some efficiency is necessarily lost due to the accumulation of scale within the cathode chamber. Further, as is well known, it is more difficult and time consuming to dissolve an accumulation of salts than, if possible, to prevent their initial formation. Thus it is a significant advantage to operate a cell in a manner which substantially prevents scale formation rather than to remove it after it has accumulated.

In accordance with the method, the flow rate to the cathode system may be adjusted such that the effluent catholyte is held to a pH of 7.0 or greater to prevent the dumping of acidic solution when the cathode effluent is removed from the cell and passed to waste.

These and other advantages and features of the invention will become more apparent form the drawings and description of the preferred embodiment which follow.

DESCRIPTION OF THE DRAWING

The drawing is a schematic representation of the preferred embodiment of the invention.

DESCRIPTION OF THE PREFERRED EMBODIMENT

Referring to the drawing, there is shown a schematic illustration of an electrodialysis cell employing an electrode polarity reversal and anolyte recirculation system which comprises the invention.

An electrodialysis cell 10 is composed of an anode chamber 12, a cathode chamber 14 and a plurality of processing chambers 16 between the electrode chambers. The chambers are defined by permselective membranes within the cell, i.e. cation (K) membranes 18 and anion (A) membranes 20.

Anode 22 and cathode 24 are connected to a direct current source 26 through reversing switch 28. Feed solution to be treated by the electrodialysis action of the cell is supplied from a source and by piping, not shown. The cell products are withdrawn by similar piping, also not shown. The anode chamber solution or anolyte and the cathode chamber solution or catholyte may initially be drawn from the feed solution source or they may be from a separate solution source more suitable to the functioning of the cell. In either case, during the operation of the cell, acid is formed in anode chamber 12 and base in the cathode chamber 14.

Pump 30 provides means to circulate anolyte solution from anolyte storage tank 32 through the anode and cathode chambers by way of anolyte pipes 34 and 36. Anolyte is withdrawn from the anolyte chamber and collected in tank 32 through pipe 38 to be recirculated. The cathode chamber effluent or what is now the catholyte is withdrawn to a waste depository through pipe 40. In this manner, the acidic anolyte produced in the anode chamber is collected and passed into both the anode and cathode chambers resulting in the advantages described above.

Although this arrangement acts to inhibit scale buildup in the cathode chamber, some deposit will accumulate which may be removed by electric and hydraulic reversal of the cell. Upon activation of a polarity reversing switch 28, a switching valve 42 operates to direct the output of electrode chamber 12, now the cathode chamber, to the waste depository through pipe 43. Switching valve 44 similarly operates to direct the output of electrode chamber 14, now the anode chamber, to the anolyte storage tank through pipe 45. The valves are preferably three way solinoid valves electrically coupled to the reversing switch as would be obvious to those skilled in the art.

Cathode effluent removed from the cell to the waste depository in either mode of operation must be replenished. A convenient method is to add solution directly to the anolyte storage tank as required. This may be accomplished by employing a level sensor 46 in conjunction with a control valve 48 to admit solution through pipe 50 from a source not shown. If insufficient acid is generated in the anode chamber to counteract scale formation, the replenishment solution may be acidic.

In order to conserve the acidic anolyte, it is desirable to adjust the flow rate into the anode and cathode chambers from the anolyte storage tank such that the pH of the cathode effluent in either mode of operation is not less than 7.0. This may be done by interposing control valves 52 and 53 in pipes 34 and 36 and adjusting the anolyte volume through the valve such that a volume of anolyte just sufficient to neutralize the base produced in the cathode chamber is introduced into the cell. Any means well known may be used to determine the pH of the catholyte.

The apparatus described above was assembled and operated according to the following examples.

EXAMPLE 1

An electrodialysis stack with an electrode system similar to that shown in the drawing was operated on a feed solution of 3000 ppm of salt. The feed solution had a pH of about 7.8 and a salt composition, on an equivalent basis, as follows:

| CATIONS | | Percent |
|---|---|---|
| Sodium | | 66 |
| Calcium | | 22 |
| Magnesium | | 12 |
| ANIONS | | |
| Chloride | | 69 |
| Sulfate | | 24 |
| Bicarbonate | | 7 |

The stack comprised 960 diluting and 960 concentrating chambers (960 cell pairs), divided into three stages of 320 cell pairs each, and two terminal electrode chambers in each stage (six chambers) containing flat niobium electrodes coated with platinum. Plastic intermembrane spacers 2 mm thick, and with 5960 square cm of electrode and membrane exposed area, defined each of the six electrode chambers and served as physical support for the cation membranes located adjacent to the electrodes. The membranes defining the dilute and concentrating chambers were about 0.6 mm thick. The cation membranes adjacent to each electrode were about 1.5 mm thick. The electrode feed to the stack was drawn from the anolyte storage tank (having about a 100 liter capacity) by the electrode pump and fed to the stack at about 8 liters per minute in two streams fed separately to the cathodic and anodic chambers at approximately 4 liters per minute each. Three way solenoid valves were located in the cathodic effluent lines to direct the anodic effluent to the anolyte storage tank and the cathodic effluent to waste. The solenoid valves were phased with the polarity reversed. A float valve in the anolyte storage tank admitted feed water at about 4 liters per minute to replenish the volume of cathodic effluent lost to waste. A total direct current of about 120 amperes (60 to the first stage, 40 to the second stage, and 20 to the third stage) was impressed across the electrodes with equal polarity reversals occurring about every 15 minutes. The salt feed solution flowed through the spacers of the dilute and concentrating chambers at a velocity of about 20 cm/sec, or about 500 liters per minute. All the streams, including the electrode streams, flowed in series through the three stages from Stage 1 to Stage 3. The unit operated successfully for several days at about 80 percent salt removal. The pH's of the influent electrode solution (anolyte recirculation tank), and the anodic and cathodic chambers effluent solutions were, respectively, about 3.0, 2.0, and 11. Inspection of the chambers after shutdown, especially the electrode chambers, revealed no significant scale accumulation therein.

EXAMPLE 2

The unit of EXAMPLE 1 was operated with a sulfuric acid feed to the anolyte storage tank. Sulfuric acid at 5 percent concentration was fed at about 0.09 liters per minute. The pH's of the electrode influent flow (anolyte tank), and the anodic and cathodic effluent solutions were, respectively, about 2.0, 1.8, and 8.

EXAMPLE 3

The unit of Example 1 was constructed with anion instead of cation membranes located next to the electrodes. During operation the pH's of the inlet electrode flow (anolyte tank), and the anodic and cathodic chambers effluent solutions were, respectively, about 2.5, 2.0, and 11.

EXAMPLE 4

The unit of Example 3 was operated with sulfuric acid feed to the anolyte storage tank. Sulfuric acid at 5 percent concentration was fed at about 0.03 liters per minute. The pH's of the electrode influent flow (anolyte tank), and the anodic and cathodic effluent solutions were, respectively, about 2.0, 1.5, and 8.

The embodiments of this invention in which an exclusive property or privilege is claimed are defined as follows:

1. In an electrodialysis cell having an anode, an anode chamber, a cathode, a cathode chamber and at least one fluid treatment chamber, positioned between said anode and cathode chambers, said chambers separated by permselective membranes, the improvement which comprises:
   a. a direct current source connected to said anode and cathode;
   b. an anolyte storage tank;
   c. first anolyte pipe means connecting the output of said anolyte tank to the input of said anode chamber;
   d. second anolyte pipe means connecting the output of said anolyte tank to the input of said cathode chamber;
   e. third anolyte pipe means connecting the output of said anode chamber to the input of said anolyte tank;
   f. fourth anolyte pipe means connecting the output of said cathode chamber to the input of said anolyte tank;
   g. first waste pipe means connected to the output of said anode chamber;

h. second waste pipe means connected to the output of said cathode chamber;

i. pump means for simultaneously circulating anolyte through said anode and cathode chambers;

j. first switching valve means for alternatively directing the output of said anode chamber through said third anolyte pipe and said first waste pipe;

k. second switching valve means for alternatively directing the output of said cathode chamber through said fourth anolyte pipe and said second waste pipe; and l. reversing switch means for reversing the polarity of said direct current source, for activating said first valve switching means for directing the output of said anode chamber through said first waste pipe, and for activating said second switching valve means for directing the output of said cathode chamber through said fourth anolyte pipe.

2. The apparatus of claim 1 further including control valve means interposed between said anolyte storage tank and said anode and cathode chambers for controlling the rate of flow of anolyte between said tank and said chambers.

3. The apparatus of claim 2 further including:

a. liquid level sensing means within said anolyte storage tank; and b. means for admitting feed solution to said anolyte storage tank activated by said level sensing means.

4. In the method of substantially preventing scale buildup in the electrode chambers of an electrodialysis apparatus during the electrolytic transfer of ions from one solution to another in an apparatus comprising a plurality of spaced apart permselective membranes arranged between an anode and a cathode to define liquid containing chambers wherein a direct current is passed between said anode and cathode across said membranes and liquid, the improvement comprising:

a. providing an anolyte storage tank;

b. drawing anolyte from the anode chamber into the anolyte storage tank;

c. passing said anolyte from the anolyte storage tank simultaneously into the anode and cathode chambers;

d. recirculating said anolyte through the anode chamber;

e. withdrawing and disposing of the liquid passing out of the cathode chamber;

f. periodically reversing the polarity of the direct current;

g. drawing anolyte from the chamber that was previously the cathode chamber into the anolyte storage tank upon said reversal; and h. withdrawing and disposing of the liquid passing into the chamber that was previously the anode chamber upon said reversal.

5. The method of claim 4 wherein the flow of the anolyte into the anode and cathode chambers is maintained at a rate resulting in a catholyte effluent having a pH of substantially not less than 7.0.

6. The method of claim 4 further including the step of adding feed solution to the anoyte storage tank to maintain the quantity of solution contained therein.

7. The method of claim 4 further including the step of adding an acid solution of the anolyte storage tank to maintain an acidic pH of the solution contained therein.

* * * * *